Figure 1:
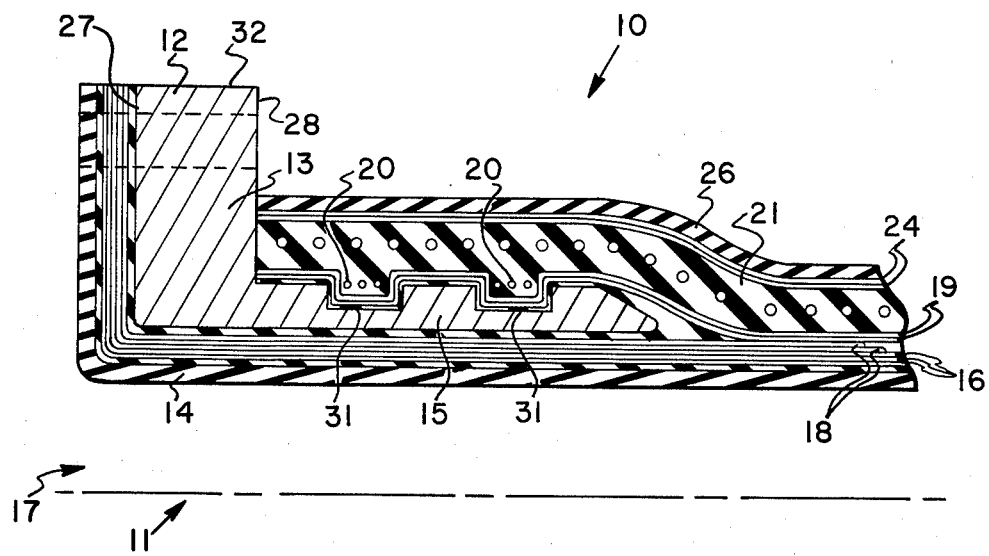

United States Patent [19]

Peavy et al.

[11] 4,366,842

[45] Jan. 4, 1983

[54] FLANGED HOSE AND METHOD OF MAKING

[75] Inventors: Benjamin W. Peavy; Virgil J. Ritter, both of Akron, Ohio

[73] Assignee: The Goodyear Tire & Rubber Company, Akron, Ohio

[21] Appl. No.: 181,925

[22] Filed: Aug. 27, 1980

[51] Int. Cl.³ .......................... B31C 5/00; F16L 11/08
[52] U.S. Cl. ..................................... 138/109; 156/188
[58] Field of Search ................. 138/109, 110; 156/188

[56] References Cited

U.S. PATENT DOCUMENTS

| | | | |
|---|---|---|---|
| 3,712,841 | 1/1973 | Skinner ................................. | 156/188 |
| 3,717,180 | 2/1973 | Ambrose et al. ..................... | 138/109 |
| 3,948,707 | 4/1976 | Grawley et al. ...................... | 156/188 |
| 4,234,019 | 11/1980 | Hornor ................................. | 138/109 |
| 4,236,386 | 12/1980 | Yates et al. .......................... | 156/188 |

Primary Examiner—Robert I. Smith
Attorney, Agent, or Firm—D. M. Ronyak

[57] ABSTRACT

A large diameter suction and discharge hose capable of withstanding compressive end loads is formed of reinforced elastomeric material and includes a fitting at each end comprising a flange butt connected to a cylindrical nipple. The nipple includes an area of reduced outside diameter between its flange and opposite end to aid in retention of the nipple to the hose. The inner tube and inner reinforcing plies extend through the bore of the fitting and are adhered to the end face of the flange of the fitting. Intermediate reinforcing plies extend over the cylindrical nipple and are forceably retained by anchoring means which extend over annular grooves provided in the fitting. A helically wound heavy gauge wire extends between the back faces of the flanges and is embedded in elastomeric material. At least one outer ply layer is provided over the helically wound heavy gauge wire. An outer cover layer of elastomeric material completes the hose. A method of making such hose is also described.

3 Claims, 3 Drawing Figures

CUT INNER AND PARTIAL PLY LAYERS AND TURNING THEM AND THE INNERTUBE RADIALLY OUTWARDLY TO COVER THE END FACE OF EACH FLANGE

FORCEABLY RETAIN THE RADIALLY OUTWARDLY TURNED PLY LAYERS AND TUBE IN CONTACT WITH THE END FACE OF EACH FLANGE WHILE CURING THE HOSE INTO AN INTEGRAL STRUCTURE

FIG. 2A

FLANGED HOSE AND METHOD OF MAKING

The abstract is not to be taken as limiting the invention of this application and in order to understand the full nature and extent of the technical disclosure of this application reference must be made to the accompanying drawing and the following detailed description.

This invention pertains to a large diameter hose suitable for suction and discharge purposes and capable of substaining end loads which tend to axially shorten or compress the hose. Hose according to the invention is particularly suitable for use in tank trains. In such application a plurality of railroad tank cars are coupled together via short lengths of hose, for example, of about 10 feet between their flanges to allow common filling and discharge of the cars.

When employed in tank train service the hose is subjected to repeated flexing as the cars travel on the rails and to a compressive end load which causes the hose to be deformed into a shape resembling that of a camel's hump, that is, having three radii of curvature and two inflection points along its course.

Hose according to the invention consists of a hose body and end nipples which are incorporated into the hose body during its construction and thereafter constitute an integral part of the hose.

Figure 2:
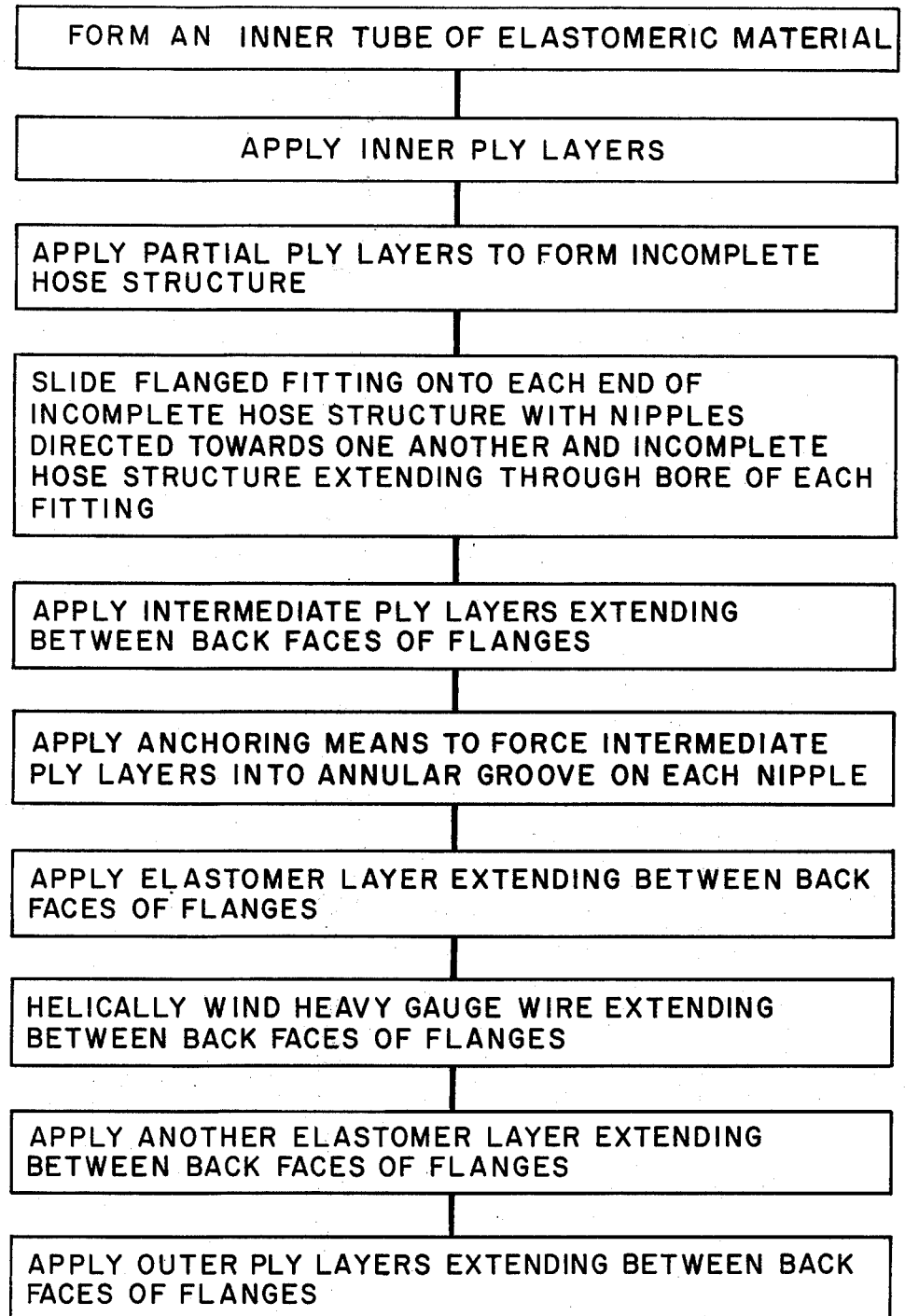

A particular embodiment of a hose according to the invention is illustrated in the accompanying drawing in which FIG. 1 shows a segment of such hose in longitudinal section; and FIGS. 2 and 2A schematically illustrate a method of making a hose according to the invention.

It is to be understood that due to limitations inherent in drafting that FIG. 1 is not to be taken or used for purposes of scale.

Referring now to FIG. 1 there is shown generally at 10 a hose according to the invention including an end fitting 12 of steel having a flange 13 butt welded to a cylindrical nipple 15. The nipple 15 includes annular grooves 31 to improve retention of the hose to the end fitting 12. It is to be understood that alternatively the cylindrical nipple 15 could include steel rings (not illustrated) welded to its outer periphery to perform this function and that, of course, a single subportion of reduced overall diameter between the ends of the cylindrical portion could provide this function.

The hose 10 will be described in sequence from its inside to its outside. Nearest the longitudinal axis 11 of the hose 10 there is provided a tube 14 of elastomeric material chosen according to the material to be conveyed by the hose. Radially outwardly of the inner tube 14 are provided multiple layers of reinforcing material such as inner plies 16 which are embedded in elastomeric material. Preferably the cords of adjacent layers of the reinforcing plies 16 extend helically about the hose axis in opposite hand orientation. Overlying the inner plies 16 are multiple layers of partial reinforcing plies 18 which extend into the hose body a predetermined amount beyond the cylindrical nipple 15 of the fitting 12, typically of the order of about two to three feet from the end of the hose 10. The inner tube 14, inner plies 16 and partial plies 18 extend through the bore 17 of the fitting 12 and over the end face 27 of the flange 13 and are adhered to the end face of the flange and preferably also to the bore of the fitting. Multiple layers of intermediate plies 19 overlie the inner plies 16, partial plies 18 and nipple 15 of each fitting 12. The intermediate plies 19 closely follow the configuration of the periphery of the nipple 15 of each fitting 12. Anchoring means such as helically wound steel wires 20 extend at least over the annular groove or grooves 31 in the nipple 15 of the fitting 12 and forceably retain the intermediate plies 19 in the groove or grooves 31. Overlying the intermediate plies 19 is a heavy layer 21 of elastomeric material having embedded therein a large diameter, for example, 0.283 inch galvanized wire 22 which extends helically the full length of the hose 10 between the back faces 28 of the flanges 13. At least one outer ply layer 24 is provided which overlies the elastomerembedded heavy gauge helically wound wire 22. A cover layer 26 of elastomeric material extends between the back faces 28 of the flanges 13 and completely covers the underlying structure. The material of the cover layer 26 is selected according to the intended environment to be encountered during use of the hose.

The end fittings 12 typically are of steel and are cleaned and adhesively treated prior to their incorporation into the uncured hose to promote adhesion to the elastomeric materials of the hose.

A typical hose according to the invention for use in tank train applications is of about ten feet overall length and has a bore diameter of about ten inches. The combined thickness of the inner tube 14 and reinforcing ply layers 16,18 which extend through the end fittings 12 and over the end faces 27 of the flanges 13 is about one half inch. Extension of the inner tube and reinforcing plies over the end face of the flange provides a built-in gasket to simplify coupling of adjacent tank cars. The exact number of plies comprising the inner ply layers, the partial ply layers, the intermediate ply layers and the outer ply layers need not be precisely as illustrated in FIG. 1. It is important, however, that some ply layers extend through the fitting and over the end face of the flange while other ply layers extend over the nipple and be restrained thereto.

A hose 10 according to the invention may be constructed as follows. This method is schematically illustrated in FIG. 2. The hose is constructed from inside to outside. On a mandrel of appropriate diameter is formed tube 14 of elastomeric material. The desired number of inner layers of rubberized fabric plies 16 are applied over the uncured elastomeric tube. The desired number of partial plies 18 are applied over the inner plies 16 such that they extend a predetermined amount toward one another from the ends of the hose structure. The overall diameter of the ends of the incomplete hose structure at this point is approximately equal to but slightly less than that of the inside diameter of the end fittings 12. The end fittings 12 which have been treated to promote adhesion to the remainder of the hose structure are thereafter positioned a predetermined amount toward one another from each end of the incomplete hose structure. Thereafter are applied the desired number of intermediate layers of rubberized fabric plies 19 which extend between the back faces 28 of the flanges 13 and over the cylindrical nipple 15 of each fitting 12. The intermediate plies 19 are forceably drawn down into the areas of lesser overall diameter, for example, annular grooves 31, on the cylindrical nipple 15 of each end fitting 12 by helically winding a small diameter steel wire 20, for example, of 0.120 inch gauge, over the areas of the cylindrical portion of reduced outside diameter. Thereafter a first layer of elastomeric material is applied which extends between the back faces 28 of the flanges 13. This is followed by a helically wound heavy body wire for example, 0.20 inch or greater, which extends between the back faces 28 of the flanges 13 which in turn is followed by a second full length layer of elastomeric material extending between the back faces 28 of the flanges 13 when the hose is cured this first and second layer of elastomeric material become layer 21 shown in FIG. 1. At least one outer layer of rubberized fabric 24 extending between the back faces 28 of the flanges 13 is applied over the aforesaid structure which in turn is followed by an outermost elastomer layer extending between the back faces of the flanges which will form the cover 26 of the hose 10. That portion of inner plies 16, partial plies 18 and inner tube 14 which extend beyond the end faces 27 of the flanges 13 is now turned radially outwardly and forced against the end faces of the flanges. This may be accomplished by attachment of a curing plate (not illustrated) at each end of the hose. The curing plate is provided with bolt holes which match those in the flange. Holes which match those provided in the flange are drilled through the turned up portions of the inner plies, partial plies and inner tube to enable bolting of a curing plate to each flange thereby forceably retaining the turned up portion of the inner tube 14, inner ply layers 18 and partial ply layers 18 against the end face 27 of the flange 13. Thereafter the excess elastomeric and reinforcing material extending radially outwardly beyond the outer rim 32 of the flange 13 is trimmed away. The inner ply layers 16 and partial ply layers 18 are cut into ribbons of approximately two to three inches width to faciliate their being turned radially outwardly to cover the end face 27 of each flange 13.

The exterior of the uncured hose is thereafter wrapped with temperature sensistive curing tape and cured into an integral structure. The curing tape and plates are removed after completion of the cure.

The term "axially" and related terms as used herein mean in the direction of or parallel to the longitudinal axis of the hose including its end fittings. The term "radially" and related terms as used herein mean in a direction intersecting perpendicularly the longitudinal axis of the hose. "Radially outwardly" means in a direction away from the longitudinal axis of the hose. "Radially inwardly" means in a direction toward the longitudinal axis of the hose.

While certain representative embodiments and details have been shown for the purpose of illustrating the invention it will be apparent to those skilled in the art that various changes and modifications may be made therein without departing from the spirit or scope of the invention.

We claim:

1. A large diameter suction and discharge hose comprised of elastomeric material incorporating reinforcing elements and including at each end thereof a rigid fitting having a cylindrical nipple and a radially outwardly extending flange butt connected to the nipple at that end of the nipple nearest the end of the hose, said nipple including at least one annular groove on its outer periphery, said flange including a planar end face and an oppositely disposed back face parallel thereto, said fitting having a bore extending therethrough in communication with that of the remainder of the hose, said hose comprising in sequence from its inside to its outside, a tube of elastomeric material which extends throughout the length of the hose and fitting, at least one inner reinforcing ply which extends throughout the length of the hose and fitting, at least one partial ply at each end of the hose which extends into the hose a predetermined amount beyond the nipple, said tube and each said inner ply and each said partial ply extending through the bore of the respective fitting and covering and being adhered to the end face of the respective flange where they are terminated, at least one intermediate ply which extends throughout the length of the hose and over said nipples to the back faces of said flanges, each said intermediate ply generally following the configuration of the periphery of said nipples, anchoring means which extend at least over said annular groove, said anchoring means having an inside diameter less than the overall diameter of said nipples, a helically wound heavy gauge wire extending throughout the length of the hose to the back faces of said flanges, the heavy gauge wire being embedded in elastomeric material, and at least one outer ply extending throughout the length of the hose to the back faces of said flanges, and a cover layer of elastomeric material extending throughout the length of the hose to the back faces of said flanges, the hose being cured into an integral structure.

2. A hose according to claim 1 including three inner reinforcing plies having cords with the cords of each ply being of opposite hand orientation relative to those adjacent thereto, at least two partial plies at each end of the hose and at least two intermediate plies, and a steel wire helically wound over said intermediate plies and forceably retaining said intermediate plies in said annular groove.

3. A method of making a large diameter suction and discharge hose of the type which includes at each end thereof a rigid fitting having a radially outwardly extending flange butt connected to a cylindrical nipple which includes on its periphery at least one annular groove, said flange including an end face and an oppositely disposed back face, the method comprising, in sequence, forming a tube of uncured elastomeric material on mandrel, applying multiple inner layers of rubberized fabric plies, applying multiple layers of rubberized plies adjacent each end of the underlying structure to form an incomplete hose structure having an outside diameter adjacent its ends approximately equal to but less than that of the inside diameter of each fitting, sliding a fitting axially onto each end of the incomplete hose structure, the cylindrical nipples being directed toward one another and a portion of the incomplete hose structure extending axially beyond the end face of the flange of each fitting, applying intermediate layers of rubberized fabric plies which extend between the back faces of said flanges and over each nipple, providing anchoring means over said intermediate ply layers to thereby force said intermediate ply layers into the annular groove on each nipple, applying a layer of uncured elastomer which extends between the back faces of the flanges, helically winding a heavy gauge wire which extends between the back faces of said flanges, applying another layer of uncured elastomer which extends between the back faces of said flanges, applying at least one outer layer of rubberized fabric which extends between the back faces of said flanges, applying an outer layer of uncured elastomeric material which extends between the back faces of the flanges, cutting the inner layers of plies and end plies which extend axially beyond the distal flanges and turning them and the inner tube elastomer layer radially outwardly, forceably retaining the radially outwardly turned ply and inner tube layers in contact with the end face of each respective flange, trimming away any material extending radially outwardly beyond the outer rim of the flange end face, wrapping the exterior of the hose with temperature sensitive curing tape, and curing the hose into an integral structure.

* * * * *

UNITED STATES PATENT AND TRADEMARK OFFICE
CERTIFICATE OF CORRECTION

PATENT NO. : 4,366,842
DATED : January 4, 1983
INVENTOR(S) : Benjamin Wayne Peavy, Virgil Jack Ritter It is certified that error appears in the above-identified patent and that said Letters Patent are hereby corrected as shown below:

Column 1, line 8, "substaining" should read -- sustaining --.

Column 2, line 14, "tomerembedded" should read -- tomer embedded --.

Claim 3, line 9, after "on" insert -- a --.

Signed and Sealed this

Twenty-sixth Day of July 1983.

[SEAL]

Attest:

GERALD J. MOSSINGHOFF

Attesting Officer        Commissioner of Patents and Trademarks